United States Patent [19]

Durham

[11] 4,004,468
[45] Jan. 25, 1977

[54] TWO-POSITION PEDAL FOR BICYCLES

[76] Inventor: Roger Owen Durham, 3944 Marathon St., Los Angeles, Calif. 90029

[22] Filed: Dec. 30, 1974

[21] Appl. No.: 537,582

[52] U.S. Cl. .............................. 74/594.4; 74/561; D12/125

[51] Int. Cl.² ........................................ B62M 3/08

[58] Field of Search ............ 74/594.4, 594.5, 594.6, 74/560, 561; D12/125

[56] References Cited

UNITED STATES PATENTS

| | | | |
|---|---|---|---|
| 598,325 | 2/1898 | McIntyre | 74/594.6 |
| 629,945 | 8/1899 | Yerby | 74/594.6 X |
| 2,069,454 | 2/1937 | Lofquist et al. | 74/594.4 |
| 2,899,842 | 8/1959 | Krokos et al. | 74/594.4 |

FOREIGN PATENTS OR APPLICATIONS

| | | | |
|---|---|---|---|
| 356,090 | 11/1905 | France | 74/594.6 |
| 236,675 | 7/1945 | Switzerland | 74/594.6 |
| 239,170 | 9/1945 | Switzerland | 74/594.6 |

Primary Examiner—Benjamin W. Wyche
Assistant Examiner—F. D. Shoemaker

[57] ABSTRACT

A two-position bicycle pedal having heel stops at different distances from the spindle, such that either the arch or ball of the foot is positioned over the spindle. A heel step is provided, for support of the heel, when the arch of the foot is over the spindle.

1 Claim, 2 Drawing Figures

TWO-POSITION PEDAL FOR BICYCLES

BACKGROUND OF THE INVENTION

This invention pertains to an improved configuration for bicycle pedals.

Currently two types of pedals are used.

One type has rubber bars spaced apart from the spindle which provide friction surfaces for the cyclist's shoe. Under heavy use by an adult, the square cross-sectioned rubber bars roll slightly, resulting in corners being presented to the bottom of the foot, rather than flat surfaces. In addition, the support area is relatively small, causing the foot to flex excessively over it. Both conditions cause premature discomfort.

A second type has serrated metal bars spaced apart from the spindle. Because of the small area in contact with the cyclist's foot, this type soon creates distress, when ordinary shoes are worn.

With either type of pedal, most often the cyclist is seen to place his heel against the pedal, thus positioning the arch of his foot over the spindle. Even when shoes without heels are worn, the foot flexes and the heel still engages the back face of the pedal, positioning its arch over the spindle.

With the arch over the spindle, the toe muscles are effectively not used, the entire work being done by the leg muscles. The possible contribution of the toe muscles is thus not used.

Very often the latter pedal type has an attached toe clip which positions the foot so the ball of the foot, rather than the arch, is over the spindle. Positioned thus, very little load is applied at the cyclist's heel, and muscles of the toe are always in tandem with those of the leg itself. This allows use of the toe muscles. However, in the ordinary individual, the toe muscles weaken before the heavier leg muscles do, creating a weak link, with the result that the cyclist can no longer pedal effectively even though he may have much strength remaining in his leg muscles.

Both positions of the foot are useful, with the ball of the foot over the spindle to allow toe and leg muscles to work together in tandem, and with the arch of the foot over the spindle to allow the leg muscles to take over by themselves, giving the toe muscles a rest.

Bicycles are increasingly being used for commuting by adults wearing street shoes with heels. Current pedals make no provision for support of the heel of such shoes, with the result that the foot flexes excessively, causing premature distress. Such heel support is not needed when the ball of the foot is over the spindle, but it is when the arch is over it.

SUMMARY OF THE INVENTION

It is one of the objects of the invention to provide a pedal capable of positioning the foot in two positions; with either the arch or the ball of the foot approximately over the spindle.

Another object of the invention is to provide a pedal which supports the heels when the arch of the foot is over the spindle.

A third object is to provide a pedal which supports relatively large areas of the cyclist's foot and prevents its undue flexing.

Accordingly, the current invention provides a two-position bicycle pedal having heel stops at different distances from the spindle, such that either the arch or the ball of the foot can be positioned over the spindle.

A heel step is provided for use when the arch of the foot is over the spindle.

Relatively broad areas of the foot are supported.

DETAILED DESCRIPTION OF THE DRAWINGS

Figure 1:
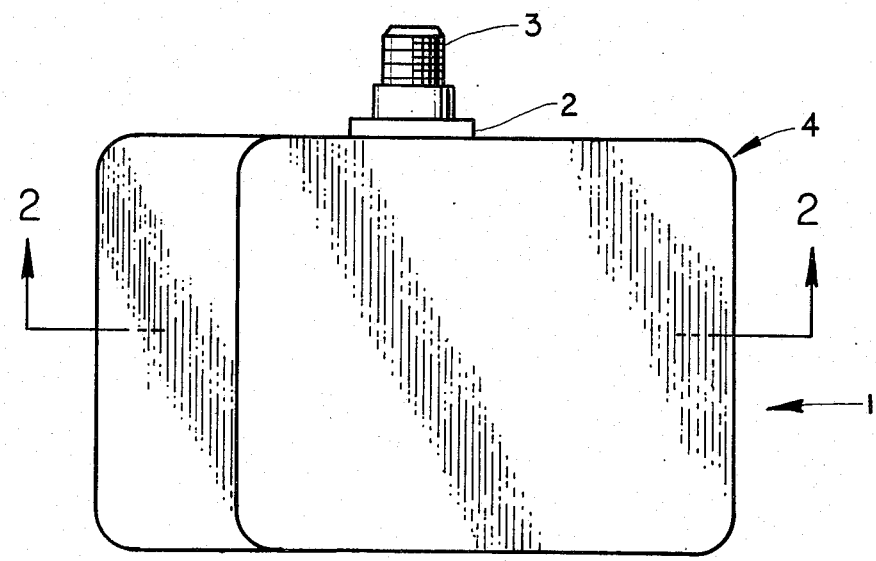
FIG. 1 shows a two-position pedal according to the invention as viewed from above.

Referring to FIG. 1, a two-position pedal means 1 has a pedal spindle housing 2 capable of rotation about a pedal spindle 3. Said pedal spindle 3 is preferably threaded to engage the crank of a bicycle. A top plate 4 is shown overlaying said spindle housing 2.

Figure 2:
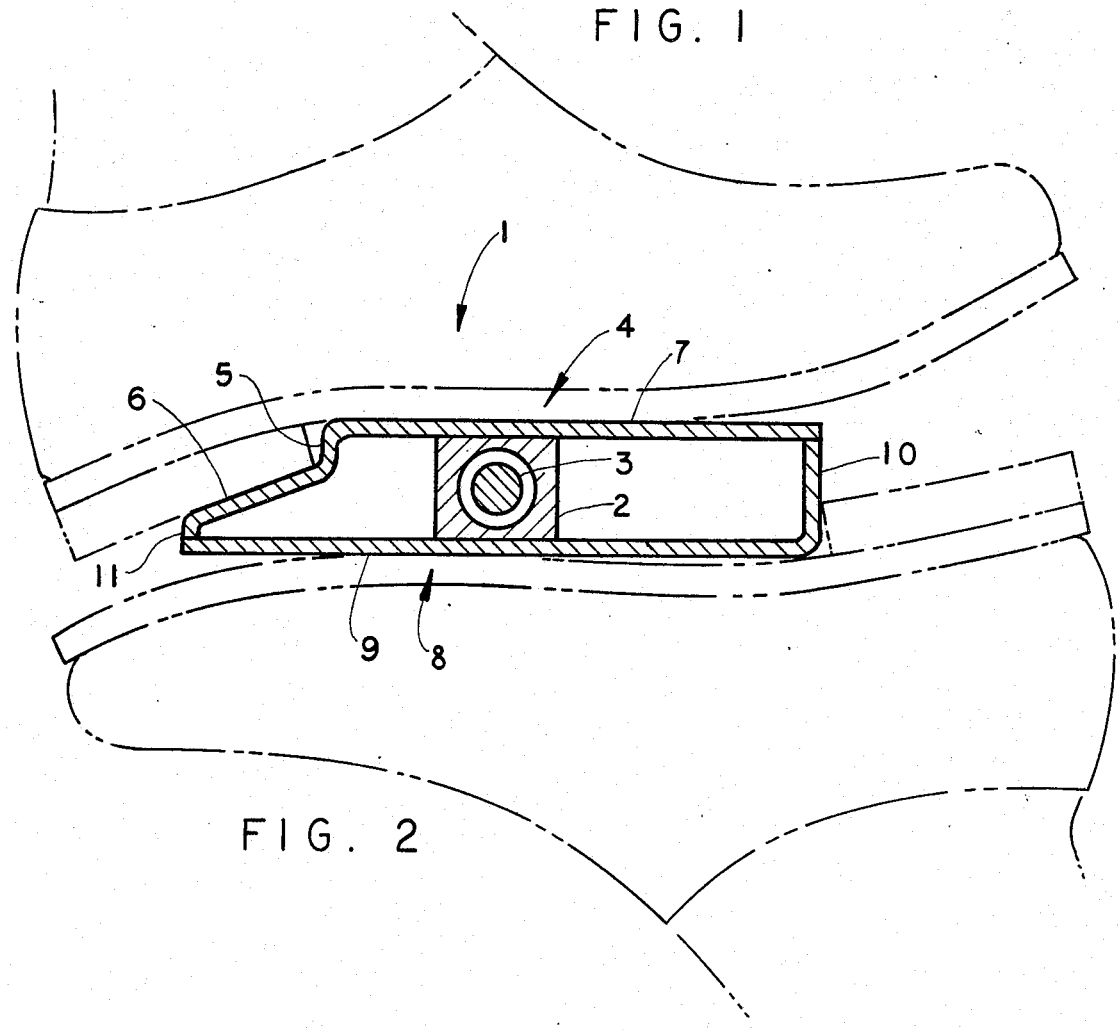
FIG. 2 shows a section through the pedal, taken along line 2—2 of FIG. 1.

In FIG. 2, said pedal spindle housing 2 is shown to be square in outside cross section, with flat surfaces presented to said top plate 4, and to a corresponding bottom plate 8. said top plate 4 has a top deck area 7, a heel step 6, and a heel stop 5. Said heel stop 5 is spaced away from said spindle 3 a distance such as to position the arch of the cyclist's foot over said spindle 3 when the face of his heel engages said heel stop 5.

A terminal face 11 is of sufficient height to fay with said bottom plate 8.

Said bottom plate 8 has a bottom deck area 9 secured to said pedal spindle housing 2 by means not shown, such as adhesive or mechanical fasteners, and a heel stop 10 for engagement with the heel of the cyclist's shoe. Said heel stop 10 is spaced away from said spindle 3 a distance sufficient to position the ball of the cyclist's foot over said spindle 3.

In use, the cyclist engages the top deck 4 with the sole of his shoe and positions his heel against heel stop 5 when he wishes to have his arch over the spindle of the pedal. Heel step 6 supports his heel, and allows a great percentage of his pedalling force to be transmitted through his heel, just as it is when he is standing, walking, or running.

When he wishes to pedal with the ball of his foot over the spindle of the pedal, he turns the pedal over, placing the sole of his shoe on bottom deck area 9 and his heel against the heel stop 10.

Thus the foot can be positioned in either of two positions, with either the arch or the ball of the foot located over the spindle of the pedal, and with relatively large areas of the foot supported.

It is anticipated that the two-position pedal of the invention will be fitted with straps to position the foot laterally and allow upward thrust of the leg. Such straps are anticipated to be capable of being pulled through from one side to the other, depending on which side of the pedal is in use.

While the deck areas are shown to be without holes or slots, such could be included for the purpose of engaging a cleat secured to the bottom of the cyclist's shoe, thus allowing the pedal to be pulled as well as pushed.

While the pedal is shown to be constructed of top and bottom plates attached to a square spindle housing, many other constructions would suffice.

I claim:

1. A two-position bicycle pedal, for use by a cyclist wearing shoes with heels, comprising;
    a. a pedal spindle, said pedal spindle threaded at one end to engage a bicycle crank;

b. a spindle housing rotatably supported by said pedal spindle;

c. a top plate secured to said spindle housing, said top plate having a top deck area adapted for supporting the sole of the cyclist's shoe, a heel stop adjacent said top deck area, said heel stop adapted for engaging the forward face of the heel of a cyclist's shoe, said heel stop located so as to approximately position the arch of the cyclist's foot over said pedal spindle, and a heel step adjacent said heel stop, said heel step adapted for supporting the heel of the cyclist's shoe;

d. a bottom plate secured to said spindle housing, said bottom plate having a bottom deck area adapted for supporting the sole of the cyclist's shoe, said bottom plate having a heel stop adapted for engaging the forward face of the heel of the cyclist's shoe, said heel stop located so as to position the ball of the cyclist's foot over said pedal spindle.

* * * * *